(12) United States Patent
Hirai et al.

(10) Patent No.: US 7,942,750 B2
(45) Date of Patent: May 17, 2011

(54) CONSTANT VELOCITY JOINT

(75) Inventors: Isao Hirai, Iwata (JP); Kazuhiko Yoshida, Iwata (JP)

(73) Assignee: NTN Corporation, Osaka (JP)

( * ) Notice: Subject to any disclaimer, the term of this patent is extended or adjusted under 35 U.S.C. 154(b) by 540 days.

(21) Appl. No.: 11/991,171

(22) PCT Filed: Aug. 9, 2006

(86) PCT No.: PCT/JP2006/315740
§ 371 (c)(1),
(2), (4) Date: Feb. 28, 2008

(87) PCT Pub. No.: WO2007/026515
PCT Pub. Date: Mar. 8, 2007

(65) Prior Publication Data
US 2009/0137326 A1 May 28, 2009

(30) Foreign Application Priority Data

Aug. 29, 2005 (JP) ................................. 2005-248181

(51) Int. Cl.
*F16D 3/223* (2006.01)
(52) U.S. Cl. ............................ 464/178; 464/906; 72/714
(58) Field of Classification Search .................. 464/111, 464/140–146, 178, 905, 906; 384/544, 589; 72/714
See application file for complete search history.

(56) References Cited

U.S. PATENT DOCUMENTS

| 6,626,580 B2 * | 9/2003 | Tajima et al. ................. 384/544 |
| 2004/0058737 A1 * | 3/2004 | Yoshida et al. |
| 2005/0257860 A1 * | 11/2005 | Takayama |

FOREIGN PATENT DOCUMENTS

| JP | 63-312949 | * 12/1988 |
| JP | 10-330836 | * 12/1998 |
| JP | 2000-303118 | * 10/2000 |
| JP | 2004-76790 | * 3/2004 |
| JP | 2006-181606 | * 7/2006 |
| WO | WO 99/02744 | 1/1999 |

OTHER PUBLICATIONS

Universal Joint and Driveshaft Design Manual, AE-7, Society of Automotive Engineers, Inc., Warendale, PA, pp. 149 & 150, TJ1079. S62 1979.*
International Search Report (PCT/ISA/210) mailed Nov. 14, 2006 in connection with International Application No. PCT/JP2006/315740.

* cited by examiner

*Primary Examiner* — Greg Binda

(57) ABSTRACT

A joint outer ring of a constant-velocity joint has a stem portion protruding from of a cup portion and inserted to a through hole of a hub in a bearing device. The joint outer ring has an abutment face abutting against an end face of a bearing inner ring fitted to an outer periphery of the hub in an outer bottom face of the cup portion, and is composed of a forged product of a steel material. The joint outer ring has a base material portion composed of a standard structure and an outer surface layer partially formed as a non-standard structure portion. The non-standard structure may be a tempered martensite structure, or a mixed structure including the tempered martensite structure and at least one of an upper bainite structure and a lower bainite structure.

5 Claims, 4 Drawing Sheets

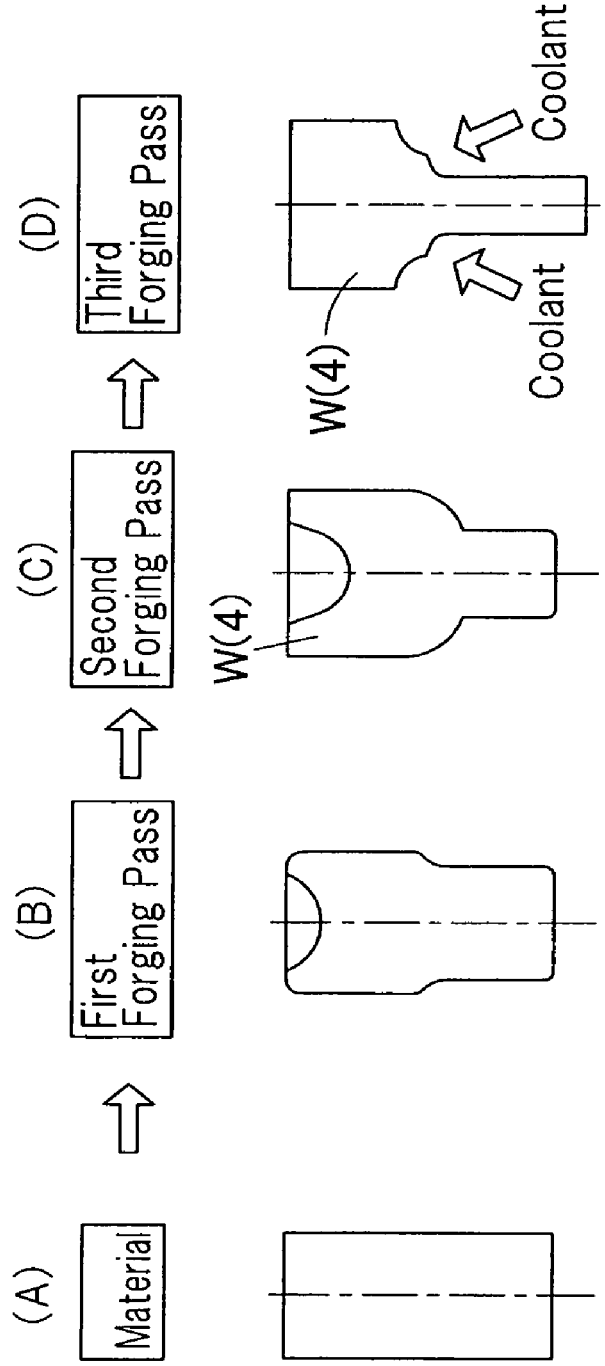
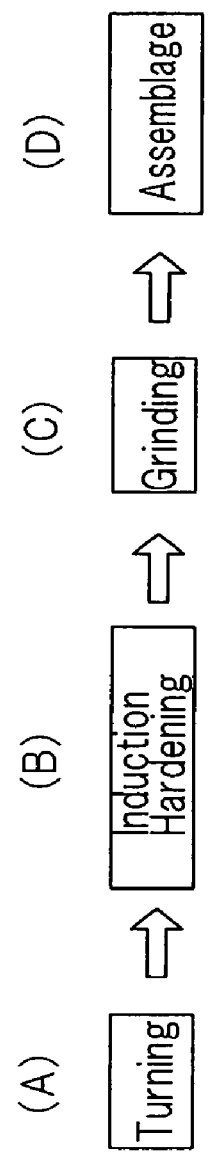

CONSTANT VELOCITY JOINT

CROSS REFERENCE TO RELATED APPLICATIONS

This application claims the benefit under 35 U.S.C. Section 371, of PCT International Application Number PCT/JP2006/315740, filed Aug. 9, 2006, which claimed priority to Japanese Patent Application Number 2005-248181, filed Aug. 29, 2005 in Japan, the contents of which are incorporated herein by reference.

FIELD OF THE INVENTION

The present invention relates to a constant velocity joint to be coupled to a bearing device for a wheel.

BACKGROUND OF THE INVENTION

A wheel support bearing device for supporting a drive wheel is fastened to a joint outer ring of a constant velocity joint by means of a nut, and transmits a driving force to the drive wheel. The joint outer ring of the constant velocity joint abuts against a bearing inner ring. Therefore, there is a case that a bending moment applied to the bearing device and the constant velocity joint during a turn of a motor vehicle causes an abrasion due to a fretting or a creep of the bearing inner ring at an end face of the bearing inner ring and an end face or a back face of the joint outer ring, which is in abutment with the end face of the bearing inner ring. If such abutting end face of the joint outer ring is worn, an axial tension generated by fastening of the nut is lowered, and as a result, a slack of the nut, an abrasion of a fitting serration portion or the like may then take place. Further, an operating angle of the joint is changed in accordance with a steering of the wheel, and a great load is applied to a joint cup portion by a large steering. Such great load may cause a fatigue breaking or a static breaking in the joint.

Conventionally, in order to solve the above problem, there have been tried an increase of a thickness or a diameter, a usage of a high strength material, an addition of a thermal refining after forging, and the like. Further, a induction heat treatment has been utilized as a countermeasure against a bending fatigue of a stem portion and an abrasion of the end face of the bearing inner ring.

However, the increase of the thickness or the diameter causes an increase of a weight. Further, the usage of the high strength material causes a reduction of a workability and an increase of manufacturing cost. The addition of the thermal refining causes a further increase of manufacturing cost. Also, since a corner portion is formed between the abutting face of the joint outer ring and the cup, the induction heat treatment to the abutting face may cause overheating of the corner portion. Accordingly, there is a case that the abutting face can not be subject to a sufficient heating temperature and as a result, a quenching hardness is lowered. Further, such overheating of the corner portion may cause a quenching crack.

SUMMARY OF THE INVENTION

An object of the present invention is to provide a constant velocity joint in which an abutment face abutting against an inner ring end face of a bearing device for a wheel is excellent in resisting an abrasion caused by a fretting, a creep of a bearing inner ring or the like, and in which a strength of a cup portion is enhanced with no increase of a weight and without using a high strength material or adding a thermal refining, either of which may cause a reduction of a workability and an increase of a cost.

In accordance with the present invention, the constant velocity joint to be connected to a bearing device for wheel support include a joint inner ring, a joint outer ring, and a torque transmitting member for transmitting a rotation. The torque transmitting member is interposed between the joint inner ring and the joint outer ring. The joint outer ring has a cup portion and a stem portion protruding axially outwardly from an outer bottom surface of the cup portion. The stem portion is inserted to a through hole of a hub of the bearing device. The cup portion has an abutting face adapted to abut to an inboard side end face of a bearing inner ring of the bearing device, which bearing inner ring is mounted on an outer periphery of the hub being provided in the outer bottom surface. In the constant velocity joint, the joint outer ring is a hot forged product of a steel material, a matrix material portion thereof represents a standard structure, and a part of the outer surface layer thereof represents a non-standard structure. The non-standard structure is any one of an upper bainite structure, a lower bainite structure and a tempered martensite structure, or a mixed structure of at least two or more of those structures.

The non-standard structure is obtained, for example, by controlling a cooling speed at the end of a forging step. Specifically, the tempered martensite structure can be obtained by wholly or partly cooling the outer surface layer of the joint outer ring at such a cooling speed as to prevent a ferrite-pearlite transformation, that is a standard structure, at the end of the forging step cooling down to a martensite transformation temperature or lower, thereafter suspending the cooling, followed by a heat-recuperation tempering by means of a elevated temperature heat in an internal portion thereof. The upper bainite structure and the lower bainite structure can be obtained by cooling the outer surface layer down to a temperature about equal to room temperature at a predetermined cooling speed at the end of the forging step. The lower bainite structure can be obtained by slowly cooling in comparison with the case of the upper bainite structure.

According to the wheel support bearing device of the foregoing construction, the following effects can be obtained. Since the abutment face 9aa of the constant velocity joint 1 abuts against the end face of the bearing inner ring 28 of the bearing device 2, the abrasion tends to occur due to the fretting, the creep of the bearing inner ring 28 or the like. However, since the non-standard structure part 30 is chosen to be one of the upper bainite structure, the lower bainite structure and the tempered martensite structure and the mixed structure of at least two or more of those structures, such non-standard structure is fine as compared with the matrix portion represented by the standard structure and the hardness thereof will be higher. Accordingly, the strength of the cup portion can increase. Further, in the non-standard structure, since solution heat treatment can be easily carried out during quenching, it is possible to lower a quenching temperature. Accordingly, even if the high-frequency quenching temperature of the abutment face is lowered, a sufficient quenching hardness can be obtained, and as a result, the abrasion can be reduced. Further, it is possible to prevent even a hardening crack of the corner portion of the abutment face. Since the hardness enhancement is limited by locally cooling, it is possible to minimize the reduction of the workability.

In the constant velocity joint in accordance with the present invention, the hardness of the non-standard structure part and the standard structure part may be appropriately set, however, the hardness of the non-standard structure may be in the range of 30 to 40 HRC, and the hardness of the matrix portion may be in the range of 85 to 105 HRB.

A lower hardness limit of the non-standard structure part is 25 HRC to secure the strength higher than the matrix material. An upper limit hardness is 40 HRC to secure a machinability.

A used material for the joint outer ring is made of a carbon steel (content of carbon is in the range of 0.45 to 0.7%), for example, in the case of S53C a hardness of the standard part is in the range of 85 to 105 HRB.

In this case, in the constant velocity joint in accordance with the present invention, although the non-standard structure part has been obtained by local cooling at the end of the forging step, the non-standard structure part may be obtained by local cooling after reheating the forged product. Further, features of the present invention is applied to the outer type of ring of the other joint formed by forging, for example, T-joint, double offset joint, LJ or the like of a sliding type joint.

In accordance with the present invention, the constant velocity joint to be connected to a bearing device for wheel support include a joint inner ring, a joint outer ring, and a torque transmitting member for transmitting a rotation. The torque transmitting member is interposed between the joint inner ring and the joint outer ring. The joint outer ring has a cup portion and a stem portion protruding axially outwardly from an outer bottom surface of the cup portion. The stem portion is inserted to a through hole of a hub of the bearing device, and an abutting face abuts to an inboard side end face of bearing inner ring mounted on an outer periphery of the hub being provided in the outer bottom surface. In the constant velocity joint, the joint outer ring is a hot forged product of a steel material, a matrix material portion thereof represents a standard structure, and a part of the outer surface layer thereof represents a non-standard structure. The non-standard structure is any one of an upper bainite structure, a lower bainite structure and a tempered martensite structure, or a mixed structure of at least two or more of those structures. In the non-standard structure, since solution heat treatment can be easily carried out during quenching, it is possible to lower a quenching temperature, to obtain a sufficient quenching hardness and to prevent even a hardening crack. Accordingly, it is possible to reduce the abrasion of the abutment face in the joint outer ring, abutting against the inner ring end face of the bearing device, due to the fretting, the creep of the bearing inner ring 28 or the like. Further, since the non-standard structure is fine in structure and a hardness thereof increased, the strength of the cup portion can increase.

BRIEF DESCRIPTION OF THE DRAWINGS

The present invention is more clearly understood from the following description of a preferable embodiment with reference to the accompanying drawings. However, the embodiment and the drawings are provided simply for illustrating and describing, and should not be utilized for defining the scope of the present invention. The scope of the present invention is defined by the appended claims. In the accompanying drawings, the same reference numerals in a plurality of drawings denote the same portions.

FIG. 3 is a flowchart showing the sequence of forging of the joint outer ring;

FIG. 4 is a flowchart showing the sequence of processing of the joint outer ring subsequent to the forging;

DETAILED DESCRIPTION OF THE PREFERRED EMBODIMENT

Figure 1:
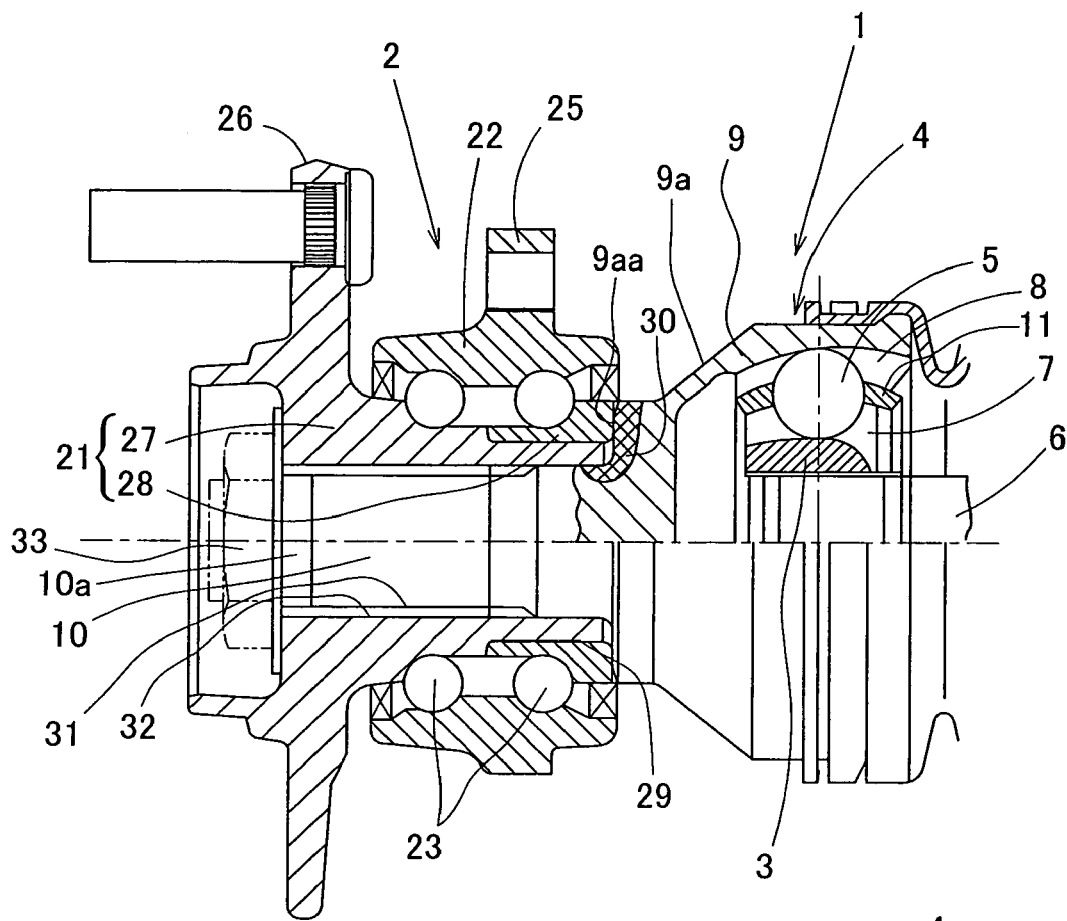
FIG. 1 is a broken front elevational view of a drive shaft device in which a constant velocity joint in accordance with an embodiment of the present invention and a bearing device for a wheel are coupled.

Hereinafter, an embodiment of the present invention will be described with reference to FIGS. 1 to 5. FIG. 1 is a broken front elevational view of a drive shaft device in which a constant velocity joint and a bearing device for a wheel are coupled. The constant velocity joint 1 includes a joint outer ring 4, a joint inner ring 3 and a torque transmission member 5 interposed between the inner and outer rings 3 and 4. The torque transmission member 5 is formed by a plurality of balls to transmit a rotation between the joint inner ring 3 and the joint outer ring 4. The joint inner ring 3 is fitted to an outer periphery of a shaft 6, and has a spherical outer surface provided with a plurality of track grooves 7 extending along the axial direction. The joint outer ring 4 has a cup portion 9 to accommodate the joint inner ring 3 therein and a stem portion 10 protruding from an outer bottom face 9a provided on the outboard side of the cup portion 9. The cup portion 9 is provided with track grooves 8, in the spherical inner side thereof, which track grooves 8 correspond to the track grooves 7 of the joint inner ring 3. The torque transmission member 5 is interposed between the corresponding track grooves 7 and 8 of the joint inner ring 3 and the joint outer ring 4. A retainer 11 retaining the torque transmission member 5 has spherical inner and outer faces guided by a spherical outer surface of the joint inner ring 3 and a spherical inner surface of the joint outer ring 4, respectively.

Figure 2:
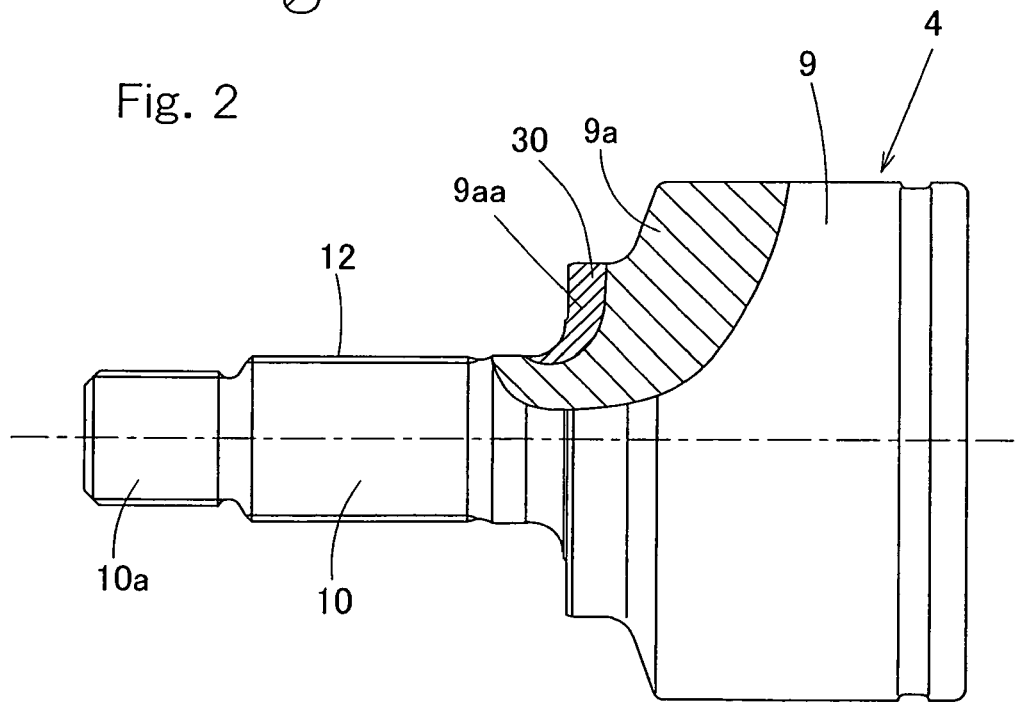
FIG. 2 is a broken front elevational view of a joint outer ring of the constant velocity joint.

As shown in an enlarged scale in FIG. 2, the stem portion 10 of the joint outer ring 4 has an outer periphery provided with a serration 12 and a tip end portion threaded to form a male thread portion 10a. The outer bottom surface 9a of the cup portion 9 has in an inner diametric area thereof an abutment face 9aa which abuts against an inboard side end face of a bearing inner ring 28 of the bearing device 2 shown in FIG. 1. The abutment face 9aa is formed as a vertical surface with respect to an axis of the joint outer ring 4. It is to be noted that in the specification as herein set forth, one side of the vehicle body away from the longitudinal center thereof when assembled in the vehicle body in which the vehicle wheel, is mounted is referred to as "outboard", whereas the other side of the vehicle body close to the longitudinal center thereof is referred to as "inboard".

The bearing device 2 has an inner member 21, an outer member 22 and double row rolling elements 23. The inner and outer member 21, 22 are rotatable with each other through the rolling elements 23 retained by retainers (not shown) one for each of the rows. The outer member 22, forming a bearing outer ring, is formed in a unitary part, and is provided with a vehicle body fitting flange 25 at an appropriate position in an axial direction. The inner member 21 includes a hub 27 having a wheel mounting flange 26, and the bearing inner ring 28 fitted to a step portion 29 formed in an outer periphery of an inboard side end of the hub 27. A raceway surface in each of the rows is provided in the hub 27 and the bearing inner ring 28, respectively. The hub 27 has a through hole 31 in a center portion thereof, and a serration 32 is provided on an inner surface of the through hole 31.

The stem portion 10 of the joint outer ring 4 of the constant velocity joint 1 is inserted to the through hole 31 of the hub 27 in such a manner that the serration 12 in an outer periphery thereof engages with the serration 32 of the hub 27. A nut 33 is screwed into the male thread portion 10a provided in the tip end portion of the stem portion 10. Fastening of the nut 33 forces the abutment face 9aa to be pressed to the inboard side end face of the bearing inner ring 28 so that the bearing device 2 and the constant velocity joint 1 are coupled with each other.

Figure 6:
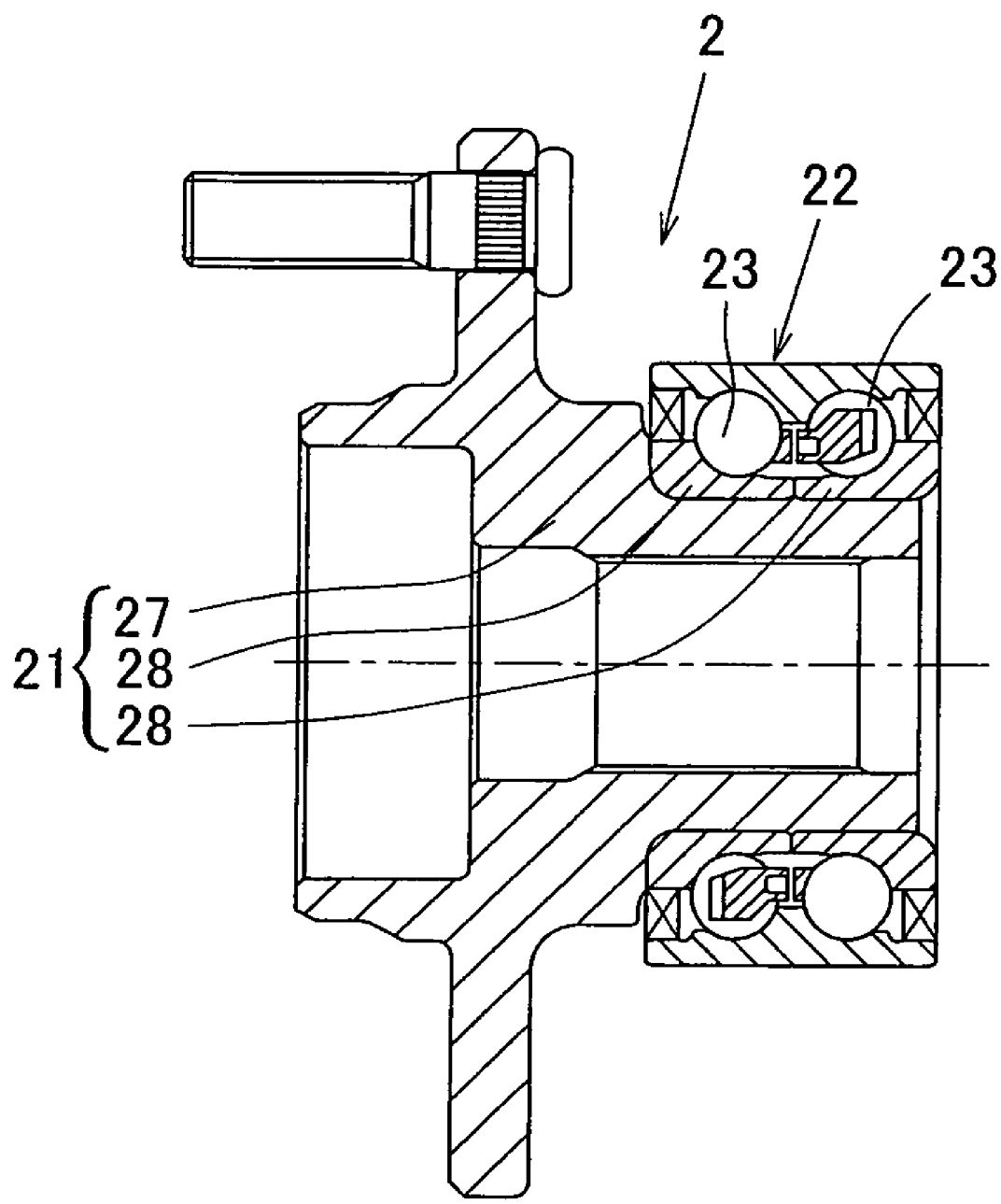
FIG. 6 is a cross sectional view showing the other example of the bearing device coupled to the constant velocity joint.

In this case, the bearing device 1 for the wheel may be structured, as shown in FIG. 6, such that double row bearing inner rings 28 are fitted to the outer periphery of the hub 27. The bearing device 2 in FIG. 6 is configured by double row bearing assembly having the bearing inner rings 28, the outer member 22 forming the bearing outer ring and the rolling elements 23 interposed between the bearing inner rings 28 and the bearing outer ring, and the hub 27 a single independent part. Also, in the bearing device 2 in FIG. 6, the inboard side end face of the bearing inner ring 28 is pressed to the abutment face 9aa of the joint outer ring 4 of the constant velocity joint 1 in FIG. 1.

The joint outer ring 4 of the constant velocity joint 1 is a forged product of a steel material, and the joint outer ring 4 has a matrix portion is formed in a standard structure, and a portion forming the abutment face 9aa is formed as a non-standard structure part 30. The non-standard structure part 30 is extended over an outer peripheral surface of a base end of the stem portion 10.

The non-standard structure of the non-standard structure part 30 is obtained by locally cooling a portion adjacent to the abutment face 9aa by showering a cooling medium at the end of a forging step, and is identical with, for example, any one of an upper bainite structure, a lower bainite structure and a tempered martensite structure, or a mixed structure of at least two or more of those structures.

FIG. 3 shows a forging step of the process of manufacturing step of the joint outer ring 4, and FIG. 4 shows a process step subsequent to forging step of the joint outer ring 4.

As shown by (A) in FIG. 3, a raw material forming a raw material, which eventually serves as a material for one joint outer ring 4, is prepared. This material is then passed through a plurality of steps of the hot forging process, for example, a first forging pass, a second forging pass and a third forging pass, to allow it to gradually approach to the shape of the joint outer ring 4 and, at the final forging step (the third forging pass), a finally forged product W of a shape approximately similar to the shape of the joint outer ring 4 can be obtained ((B) to (D) in FIG. 3).

The finally forged product W is subject to turning as shown by (A) in FIG. 4 and the track grooves 8 or the like are treated with an induction heating (as shown by (B) in FIG. 4). Thereafter, the track grooves 8 are ground (as shown by (C) in FIG. 4). The joint outer ring 4, of which track grooves 8 have been completely ground, is subsequently incorporated in the constant velocity joint (as shown by (D) in FIG. 4) to complete the latter.

The non-standard structural part 30 of the joint outer ring 4 is thermally refined when a coolant is locally sprayed to a thermal refining subject area at the end of the forging step as shown by (D) in FIG. 3.

The coolant referred to hereinabove and hereinafter may be employed in the form of liquid, a mist of liquid or gas and, particularly for example, water, oil or a low temperature air or the like. Also, depending on the use, the coolant may be mixed with, for example, a lubricant, a media and/or an anti-rusting agent to facilitate lubrication and mold releasing of the raw material, cooling and prevention of wear of a mold assembly, elimination of removal of scales by means of a shot blasting to be effected subsequent to the forging, and/or an anti-rusting effect.

The cooling may be carried out to the material W, which eventually forms the joint outer ring 4, while the latter is rotated about its own longitudinal axis so as to perform a peripherally uniform cooling of the material W. Alternatively, without the material W being rotated, a coolant spraying device (not shown) may be turned around the material W.

For the spraying of the coolant, a cooling jacket (not shown) of a ring shape having a spraying holes defined therein may be employed. Where the material W which eventually forms the joint outer ring 4 is rotated, any type capable of spraying through a nozzle at a single location may be employed.

The material W, which eventually forms the joint outer ring 4, is rotated during the cooling round an axis that may be either one of vertical and horizontal axes. Also, the direction in which the coolant is sprayed may be either upwards or downwards and may be oriented in any direction in addition to the horizontal orientation when the rotation takes place about the horizontal axis.

As for the method of retaining the material W during the cooling process, which eventually forms the joint outer ring 4, any method may be used provided that a portion to be cooled can be uniformly cooled. Therefore, any of the stem portion 10 and an outer diametric portion or an inner diametric portion of the cup portion 9 may be retained.

Which one of the upper bainite structure, the lower bainite structure and the tempered martensite structure of at least two or more of those structures is to be formed as the structure of the non-standard structural part 30 as a result of the cooling can be determined by suitably choosing a cooling method which will now be described with particular reference to FIG. 5.

Figure 5:
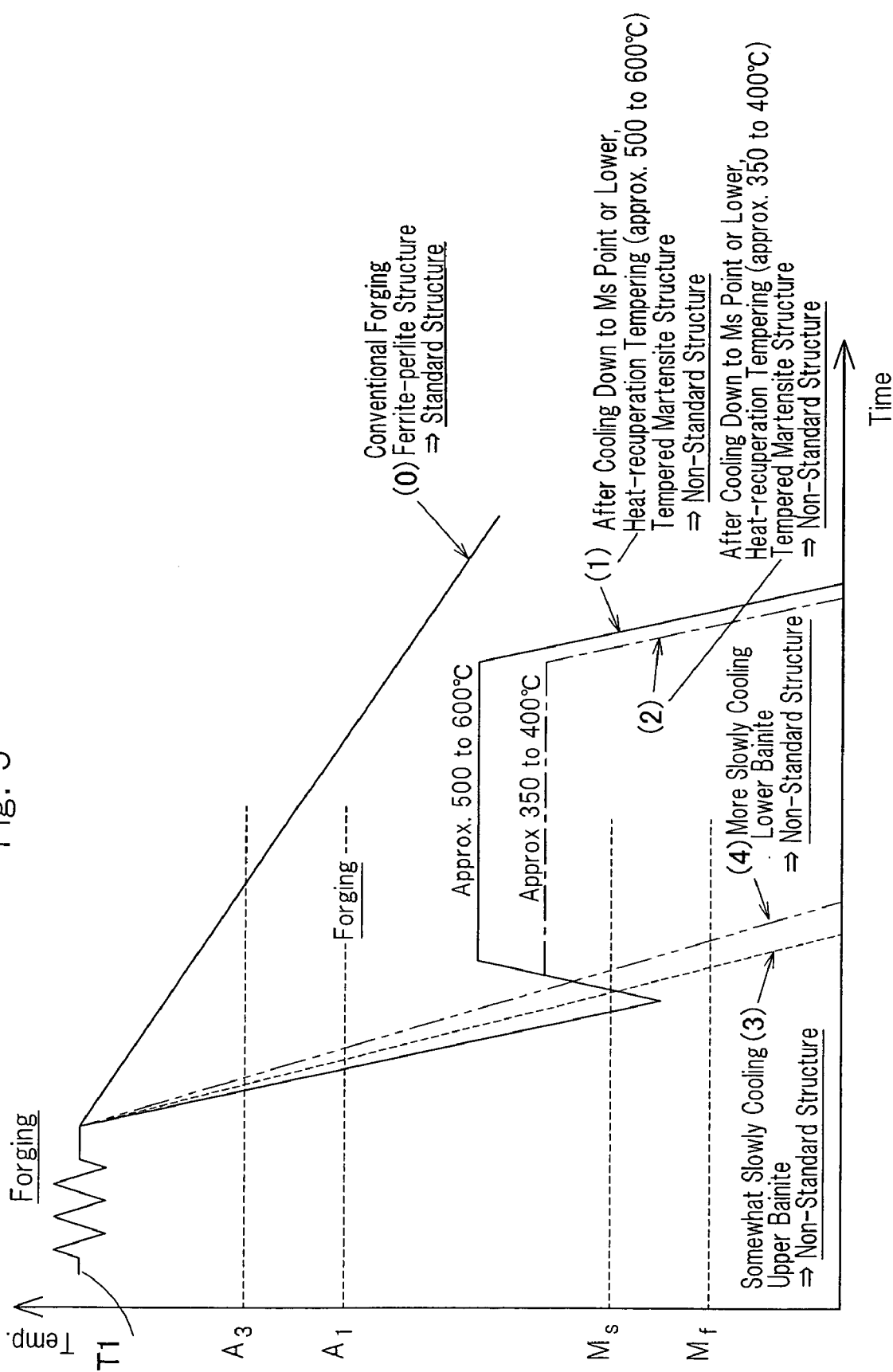
FIG. 5 is an explanatory chart showing cooling curves necessary to obtain various non-standard structures in a hot forged joint outer ring.

In FIG. 5, the axis of abscissas represents the time passed and the axis of ordinates represents the temperature. Symbols A1 and A3 shown in FIG. 5 represents the A1 transformation point and the A3 transformation point, respectively. Symbols Ms and Mf shown in FIG. 5 represent a martensite start point (hereinafter referred to as Ms point) and a martensite finish point (hereinafter referred to as Mf point), respectively.

Steel material forming the raw material is a carbon steel containing carbon in a quantity within the range of 0.45 to 0.75% such as, for example, S53C or the like.

Referring to FIG. 5, as shown by a curve (0), if the joint outer ring is merely air cooled from a forging temperature T1 (which is higher than the A3 transformation point), the standard structure, which is a structure formed by the conventional forging, that is, a ferrite-pearlite structure will develop.

Curves (1) and (2) represent cooling curves applicable where as a non-standard structure, a tempered martensite structure, which is a thermally refined structure, is to be obtained. When at the end of the hot forging step the joint outer ring (the material) to be thermally refined is partly cooled down to a temperature falling within the range of Ms point and Mf point and is subsequently heat-recuperated and tempered at a predetermined temperature range the tempered martensite structure can be obtained as the non-standard structure. If the temperature at which heat-recuperation tempering takes place is chosen to be within the range of approximately 500 to approximately 600° C., the thermally refined structure will become sorbite. On the other hand, if the temperature at which heat-recuperation tempering takes place is chosen to be within the range of approximately 350 to approximately 400° C., the thermally refined structure will become troostite.

Curves (3) and (4) shown in FIG. 5 represent respective cooling curves applicable where as a non-standard structure, an upper bainite and a lower bainite are to be obtained, respectively. When at the end of the hot forging step, as a controlled cooling, cooling is performed somewhat slowly at a rate lower than the cooling speed (the cooling speed required to form the martensite) employed during the tempering or quenching, the thermally refined structure will develop to the upper bainite. However, when the tempering is carried out at a cooling speed which is more slowly than this cooling speed, the thermally refined structure will develop to the lower bainite.

It is to be noted that although various cooling methods have been described with particular reference to FIG. 5, any of the cooling methods represented respectively by the curves (1) to (2) out of the cooling methods represented respectively by the curves (1) to (4) shown in FIG. 5 is preferably employed particularly where the non-standard structural part 30 is provided locally such as, for example, at the abutment face 9aa of the joint outer ring 4 shown in connection with the example of FIG. 1. In the case that the whole surface of the joint outer ring is intended to be formed as the non-standard structure part 30, the cooling method shown by the cooling curves (3) and (4) may be employed.

According to the wheel support bearing device of the foregoing construction, the following effects can be obtained.

obtained, and as a result, the abrasion can be reduced. Further, it is possible to prevent even a hardening crack of the corner portion of the abutment face.

Since the strength is increased, the increase of the weight due to the increase of the thickness can be avoided, and also, the reduction of the workability and the increase of the cost can be avoided otherwise caused by the usage of the high strength material and the addition of the thermal refining.

In the case that the non-standard structure is partly provided in the joint outer ring 4 by means of the partial cooling or the like, the hardness enhancement is limited only to a specific position to be hardened. Accordingly, it is possible to minimize the reduction of the workability such as the machinability of the whole joint outer ring 4.

Table 1 shows an abrasion characteristic of the abutment face 9aa, according to the embodiment shown in FIG. 1, in a bearing rotating test under a load condition that a turning G in an actual car comes to 0.8 by comparing with the conventional example.

An abrasion loss of the embodiment is reduced by 25% in comparison with the conventional example. A hardness after forging and a hardness after high-frequency heat treatment in the embodiment are higher than those of the conventional example, that is, the abrasion loss is reduced due to the increased hardness.

TABLE 1

Abrasion characteristic of abutment face 9aa

| | After forging | | Hardness after high-frequency | |
| --- | --- | --- | --- | --- |
| | Structure | Hardness | heat treatment | Abrasion loss |
| Conventional example | Standard structure | 100HRB | 690Hv | Reference |
| Embodiment | Non-standard structure (tempered martensite) | 35HRC | 750Hv | Reduce by 25% in comparison with conventional example |

Since the abutment face 9aa of the constant velocity joint 1 abuts against the end face of the bearing inner ring 28 of the bearing device 2, the abrasion tends to occur due to the fretting, the creep of the bearing inner ring 28 or the like. However, since the non-standard structure part 30 is chosen to be one of the upper bainite structure, the lower bainite structure and the tempered martensite structure and the mixed structure of at least two or more of those structures, such non-standard structure is fine as compared with the matrix portion represented by the standard structure and the hardness thereof will be higher. Accordingly, the strength of the cup portion can increase. Further, in the non-standard structure, since solution heat treatment can be easily carried out during quenching, it is possible to lower a quenching temperature. Accordingly, even if the high-frequency quenching temperature of the abutment face is lowered, a sufficient quenching hardness can be Further, Table 2 shows results of a static torsion strength test (an operating angle 46 degrees) of the cup portion 9 in the embodiment in which the joint outer ring cup portion is formed as the non-standard structure, in comparison with the conventional example.

The static torsion strength in the embodiment is improved by 20% in comparison with the conventional example. The hardness after forging and the hardness after high-frequency heat treatment in the embodiment are higher than those of the conventional example, and the static torsion strength is improved due to the increased hardness.

TABLE 2

Static torsion strength of cup portion

| | After forging | | |
| --- | --- | --- | --- |
| | Structure | Hardness | Static torsion strength |
| Conventional example | Standard structure | 100HRB | Reference |
| Embodiment | Non-standard structure (tempered martensite) | 35HRC | Increase by 20% in comparison with conventional example |

In this case, although in the embodiment, the non-standard structure part has been obtained by local cooling at the end of the hot forging step, the non-standard structure part may be obtained by local cooling after reheating the forged product.

As mentioned above, the description is given of the preferable embodiment with reference to the accompanying drawings, however, those skilled in the art can easily estimate various changes and modifications within an obvious range by viewing the specification of the present invention.

Accordingly, such the changes and modifications are understood to be within the scope of the invention defined by claims.

What is claimed is:

1. A constant velocity joint connected to a bearing device to support a wheel, the constant velocity joint comprising:
   a joint inner ring;
   a joint outer ring; and
   a torque transmitting member to transmit a rotation,
   the torque transmitting member being interposed between the joint inner ring and the joint outer ring,
   the joint outer ring having a cup portion and a stem portion protruding axially outwardly from an outer bottom surface of the cup portion,
   the stem portion being inserted to a through hole of a hub of the bearing device, and
   the cup portion having an abutting face adapted to abut an inboard side end face of a bearing inner ring of the bearing device, which bearing inner ring is mounted on an outer periphery of the hub being provided in the outer bottom surface,
   the joint outer ring being a hot forged product of a steel material, a matrix material portion thereof representing a standard structure, and a part of the outer surface layer thereof representing a non-standard structure, the non-standard structure being a tempered martensite structure or a mixed structure comprised of the tempered martensite structure and at least one of an upper bainite structure and a lower bainite structure, and
   the non-standard structure being obtained by cooling at the end of the hot forging step, followed by self-heat-recuperation or heat-recuperation tempering.

2. A constant velocity joint as claimed in claim 1, wherein the part of the outer surface layer is showered with a coolant to cool thereby to obtain the non-standard structure.

3. A constant velocity joint as claimed in claim 1, wherein a hardness of the non-standard part is in the range of 30 to 40 HRC, and a hardness of the matrix portion is in the range of 85 to 105 HRB.

4. A constant velocity joint as claimed in claim 1, wherein the steel material is made of a carbon steel.

5. A method of manufacturing a constant velocity joint to be connected to a bearing device for wheel support as claimed in claim 1, the method comprising:
   forging a forging a raw material, which eventually serves as a material for the joint outer ring, so as to obtain a finally forged product of a shape approximately similar to the shape of the joint outer ring;
   completing the joint outer ring by turning the finally forged product, treating a track groove of the turned product with an induction heating and grinding the track groove; and
   thermally refining the completed joint outer ring by cooling, followed by self-heat-recuperation or heat-recuperation tempering so as to make a part of the outer surface layer of the joint outer ring represent a non-standard structure, thereby rendering the non-standard structure to be a tempered martensite structure, or a mixed structure comprised of the tempered martensite structure and at least one of the upper bainite structure and the lower bainite structure, while leaving a matrix material portion of the joint outer ring to represent a standard structure.

* * * * *

UNITED STATES PATENT AND TRADEMARK OFFICE
CERTIFICATE OF CORRECTION

PATENT NO.        : 7,942,750 B2
APPLICATION NO.   : 11/991171
DATED             : May 17, 2011
INVENTOR(S)       : Isao Hirai et al.

Page 1 of 1

It is certified that error appears in the above-identified patent and that said Letters Patent is hereby corrected as shown below:

Title Page Column 2 (Abstract), Line 2, After "from" delete "of".
Column 10, Line 14, In Claim 5, after "forging a" delete "forging a". (Second Occurrence)

Signed and Sealed this
Thirteenth Day of September, 2011

David J. Kappos
*Director of the United States Patent and Trademark Office*